(12) United States Patent
Guski et al.

(10) Patent No.: US 6,292,896 B1
(45) Date of Patent: Sep. 18, 2001

(54) METHOD AND APPARATUS FOR ENTITY AUTHENTICATION AND SESSION KEY GENERATION

(75) Inventors: Richard Henry Guski, Red Hook; John Carr Dayka, Highland; Harvey Tildon McGee, Hyde Park; Bruce Robert Wells, Kingston, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/785,939

(22) Filed: Jan. 22, 1997

(51) Int. Cl.[7] .................................................. H04L 9/12

(52) U.S. Cl. ................................................... 713/169

(58) Field of Search ................................. 380/21, 23, 25, 380/44, 283, 282; 713/171, 162, 169, 159

(56) References Cited

U.S. PATENT DOCUMENTS

| | | | |
|---|---|---|---|
| 4,649,233 | * | 3/1987 | Bass et al. ............................ 713/171 |
| 4,850,019 | | 7/1989 | Matyas, Jr. et al. . |
| 4,956,863 | | 9/1990 | Goss . |
| 5,163,097 | * | 11/1992 | Pegg ....................................... 380/21 |
| 5,222,140 | | 6/1993 | Beller et al. . |
| 5,241,599 | | 8/1993 | Bellovin et al. . |
| 5,299,263 | | 3/1994 | Beller et al. . |
| 5,323,464 | | 6/1994 | Elander et al. . |
| 5,345,506 | | 9/1994 | Tsubakiyama et al. . |
| 5,406,628 | | 4/1995 | Beller et al. . |
| 5,440,635 | | 8/1995 | Bellovin et al. . |
| 5,491,749 | | 2/1996 | Rogaway . |
| 5,491,750 | | 2/1996 | Bellare et al. . |
| 5,495,533 | | 2/1996 | Linehan et al. . |
| 5,517,567 | | 5/1996 | Epstein . |
| 5,539,824 | | 7/1996 | Bjorklund et al. . |
| 5,761,305 | * | 6/1998 | Vanstone et al. ....................... 380/21 |
| 5,784,463 | * | 7/1998 | Chen et al. ........................... 713/171 |

FOREIGN PATENT DOCUMENTS

95/04416   2/1995  (WO) .

OTHER PUBLICATIONS

E.Basturk et al, Efficient Methods for Two Party Entity Authentication and Key Exchange in a High Speed Environment,IBM Technical Disclosure Bulletin,295–296, Mar. 1995.*

Ray Bird et al., The KryptoKnight Family of Light–Weight Protocols for Authentication and Key Distribution, IEEE, 31–39, Feb. 1995.*

(List continued on next page.)

*Primary Examiner*—Tod Swann
*Assistant Examiner*—Matthew Smithers
(74) *Attorney, Agent, or Firm*—William A. Kinnaman, Jr.

(57) ABSTRACT

A system for authenticating a first entity to a second entity and for simultaneously generating a session key for encrypting communications between the entities. The first entity generates an authentication value by encrypting time-dependent information using a long-lived secret key shared by the entities and transmits the authentication value to the second entity. The first entity independently encrypts other time-dependent information using the long-lived key to generate a session key that cannot be derived from the authentication value without the long-lived key. Upon receiving the transmitted authentication value, the second entity checks the transmitted authentication value using the shared long-lived key to determine whether it is valid. If the authentication value is valid, the second entity authenticates the first entity and generates an identical session key from the same shared secret information and time-dependent information. The encrypted time-dependent information is passed through a key weakening function to generate a weakened key which is used as the session key. The key weakening function includes a one-way function to protect the input value from discovery by an attacker who may have ascertained the weakened session key.

27 Claims, 10 Drawing Sheets

OTHER PUBLICATIONS

"Advances in Cryptology—CRYPTO '94" Y. G. Desmedt, 14th Annual International Cryptology Conference, Aug. 1994, Springer–Verlag, p 216–233.

"Computer Security—ESORICS 92" Deswarte et al., Springer–Verlag, 1992 2nd European Symposium On Research in Computer Security, pp. 155–174.

"Efficient Methods for . . . High Speed Environment", E. Basturk et al., IBM Technical Disclosure, vol. 38, No. 3, Mar. 1995, pp. 295–297.

"Firewalls aren't Enough:Authentication and Key Distribution Systems" R. Oppliger, Computer Security Journal, vol. XI, No. 2, 1995, p. 15–24.

"Secure and . . . key distribution", Janson et al., Elsevier Science B.V. vol. 18, No. 9, Sep. 1995, pp. 645–653.

"The KryptoKnight Family of Light–Weight Protocols for Authentication and Key Distribution", R. Bird et al., IEEE/ACM Transactions on Networking, vol. 3, No. 1, Feb. 1995, pp. 31–41.

* cited by examiner

METHOD AND APPARATUS FOR ENTITY AUTHENTICATION AND SESSION KEY GENERATION

BACKGROUND OF THE INVENTION

1. Field of the Invention

This invention relates to an authentication and session key generation system and, more particularly, to a method and apparatus for authenticating a first entity to a second entity and for generating a session key for communications between the entities.

2. Description of the Related Art

Often it is desirable to generate a short-lived session key for communications between two entities such as a client application and a server application in a client/server system. The session key should be generated in such a manner that it cannot be discovered by a third party, even though the key generation protocol is performed over a insecure communication channel subject to interception by that third party.

The Diffie-Hellman key agreement protocol provides a procedure, using asymmetric encryption techniques, for establishing a secret session key between two parties, even though they share no secret information at the outset and communicate entirely over public channels. (Asymmetric, or public key, procedures are those in which the communicating parties use mathematically related but different keys, for example, a public encryption key and a private decryption key that cannot be feasibly derived from the public key. Symmetric encryption techniques such as DES, on the other hand, use the same key for both encryption and decryption) The procedure is described at page 649 of W. Diffie and M. E. Hellman, "New Directions in Cryptography", *IEEE Transactions on Information Theory*, vol. IT-22, no. 6, November 1976, pp. 644–654, and in U.S. Pat. No. 4,200,770, both of which are incorporated herein by reference. However, the base Diffie-Hellman procedure provides no inherent authentication, so that party A, believing that he has established a session key with party B, may have in fact established a key with party C, who is masquerading as party B. In addition, since the Diffie-Hellman key agreement protocol is an asymmetric procedure, it is computationally expensive relative to such symmetric procedures as DES encryption.

Various other systems, including enhancements of the Diffie-Hellman procedure, provide for both authentication and session key generation. Such systems are described, for example, in the commonly owned copending application of S. M. Matyas et al., Ser. No. 08/736,774, filed Oct. 25, 1996, entitled "Method and Apparatus for Establishing an Authenticated Shared Secret Value Between a Pair of Users", as well as in E. Basturk et al., "Efficient Methods for Two Party Entity Authentication and Key Exchange in a High Speed Environment", *IBM Technical Disclosure Bulletin*, vol. 38, no. 3, March. 1995, pp. 295–297, both of which are incorporated herein by reference. However, such systems often require multiple communications between entities, and systems using public key techniques retain the disadvantage of requiring computationally expensive operations. What is desired is a simpler and more efficient technique that combines authentication with session key generation.

SUMMARY OF THE INVENTION

The present invention contemplates an authentication and key agreement system that is an enhancement of the authentication system described in commonly owned U.S. Pat. No. 5,592,553 to D. Coppersmith et al., entitled "Authentication System Using One-Time Passwords", incorporated herein by reference.

The Coppersmith et al. patent discloses a system for authenticating a first entity such as a user located at a requesting node to a second entity such as a host application located at an authenticating node using one-time passwords that change pseudorandomly with each request for authentication. At the requesting node, a non-time-dependent value is generated from nonsecret information identifying the user and the host application, using secret information comprising a encryption key (known as the signon key) shared with the authenticating node. The non-time-dependent value is combined with a time-dependent value (e.g., time-of-day or time/date) to generate a composite value that is encrypted to produce an authentication parameter. The authentication parameter is reversibly transformed into an authentication value (specifically, an alphanumeric character string) that is transmitted as a one-time password to the authenticating node.

At the authenticating node the received password is transformed back into the corresponding authentication parameter, which is decrypted to regenerate the composite value. The non-time-dependent value is replicated at the authenticating node using the same nonsecret information and encryption key shared with the requesting node. The locally generated non-time-dependent value is combined with the regenerated composite value to regenerate the time-dependent value. The user is authenticated if the regenerated time-dependent value is within a predetermined range of a time-dependent value that is locally generated at the authenticating node.

In accordance with the present invention, the password generation procedure described in the Coppersmith et al. patent is modified so that a cryptographic session key is generated at the same time that a requested password is generated. The session key is related to the user ID, application name, time, and secret signon key in a manner similar to the way the password is, but is a different quantity. The session key is generated in such a manner that it is computationally infeasible to calculate the session key without knowledge of the secret signon key, even if the related password is known.

The client function performing signon uses the password as described in the Coppersmith et al. patent in a normal non-encrypted signon request, but retains the co-generated session key. Typically, the password is generated by a secure server with the session key passed securely to the end user client machine, where the signon request to the target system originates. Upon receiving the password from the server (or upon generating the password internally, if no server is used), the client machine transmits the password together with other signon information over an open network to the target system application on the host machine.

Upon receiving the password from the client machine, the target system application hands it over to an authenticator (typically, an authentication server on the same machine as the target application) for evaluation. If evaluation is successful, the user is authenticated and the authenticator also generates, as a by-product of the evaluation process, a session key which is returned to the invoking application when requested.

Both parties now have knowledge of the session key without having to transmit it across a network or via some alternate channel. The session key can be used to encrypt messages between the client (the function that initially signed on) and the target application.

The present invention is advantageous in several respects. The end-user is authenticated, as is not the case with the standard Diffie-Hellman key agreement procedure. The authentication process and the key generation process are the same process and do not require "hand-shaking". Further, the overall procedure is very light weight; no protocols such as those of the Distributed Computing Environment (DCE) are required, for example.

DESCRIPTION OF THE PREFERRED EMBODIMENTS

Introduction

Figure 1:
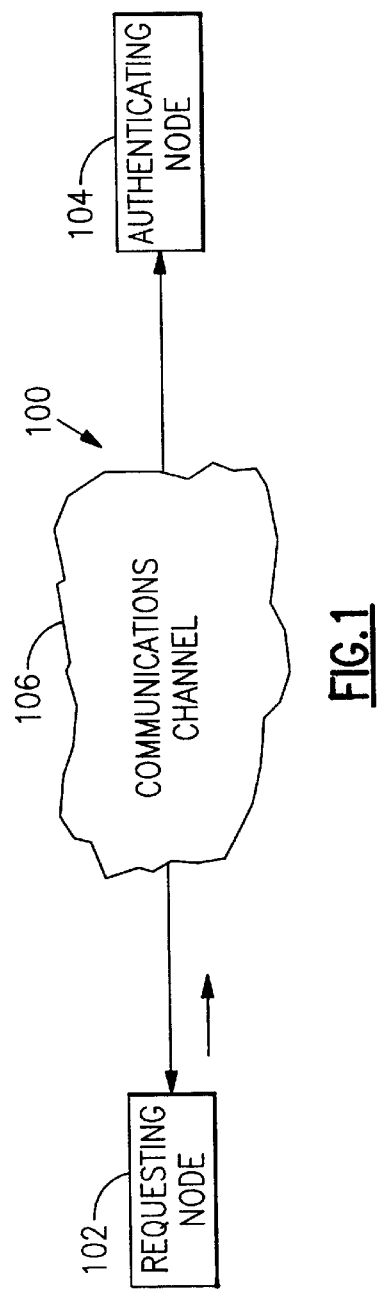
FIG. 1 is a schematic block diagram of a system in which the present invention may be used.

Referring first to FIG. 1, a system 100 employing the present invention comprises a requesting node 102 and an authenticating node 104 interconnected by a communications channel 106. Requesting node 102 may comprise a personal computer or workstation, while authenticating node 104 may comprise a host computer or server such as an IBM System/390 Parallel Enterprise Server. (IBM, System/390 and Parallel Enterprise Server are trademarks of IBM Corporation.) Communications channel 106 may comprise any suitable type known to the art.

Figure 3:
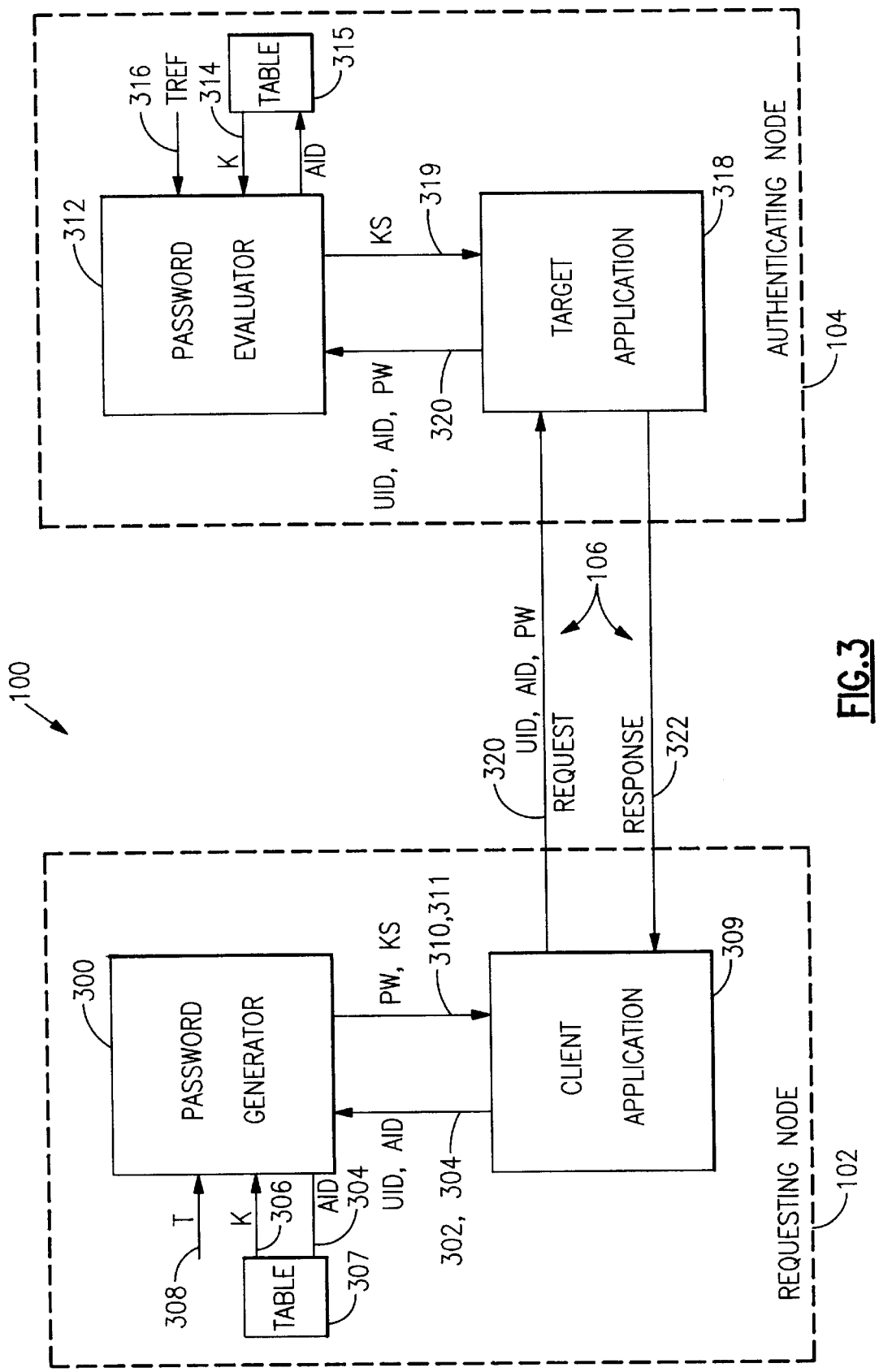
FIG. 3 is a schematic block diagram showing further details of the system shown in FIG. 1.

Referring now to FIG. 3, the requesting node 102, which is assumed to be a personal computer or workstation, contains a password generator 300. Password generator 300, which also includes the session key generation function of the present invention, is preferably implemented as a software routine (i.e., a program of instructions residing on a machine-readable program storage device such as a magnetic or optical disk) executing on the central processing unit (CPU) (not separately shown) of the machine constituting the requesting node. (Alternatively, some or all of the password generator 300 may be implemented using special-purpose hardware.) The requesting node machine 102 also has memory locations for storing a user ID (UID) 302 identifying the user, an application ID (AID) 304 identifying a host application 318 being accessed, a signon key (K) 306 used as a key for the encryptions to be described, and a time/date value (T) 308.

As indicated in FIG. 3, values 302–308 provide inputs to the password generator 300. Values 302 (UID) and 304 (AID) may originate from a client application 309 on the requesting node machine, value 306 (K) may be stored in a table 307 indexed by the application ID 304 (AID), while time/date value 308 (T) may be provided by the operating system (not separately shown) on that machine.

Password generator 300 is invoked (through the client application 309) when a user wishes to access a host application. When invoked, the password generator 300 generates a one-time password (PW) 310 and session key (KS) 311 as a function of the user ID 302, application ID 304, signon key 306 and time/date 308 and returns these values to the client application 309. Password 310 is transmitted to the authenticating node 104, together with the user ID 302 and application ID 304, as part of a signon request 320.

Session key 311 constitutes secret information that is not transmitted from requesting node 102, but is retained by the client application 309 for communicating with the target application 318. More particularly, the client application 309 uses session key 311 to encrypt messages transmitted to the target application 318 or to decrypt messages received from the target application.

The authenticating node 104, which is assumed to comprise a host computer, contains a password evaluator 312 which, like the password generator 300, also includes the session key generation function of the present invention. Password evaluator 312 is preferably implemented as software executing on the CPU (not separately shown) of the machine constituting the authenticating node. The authenticating node machine 104 also contains at least one host application 318 which may be accessed by a user at requesting node 102 upon presentation of a valid password 310. The password evaluator 312 may be either a separate program or part of a security software program such as the Security Server component of the IBM OS/390 operating system. (OS/390 is a trademark of IBM corporation.) Authenticating node 104 stores its own copy of the signon key (K) 314, which is not entrusted to the communications channel 106, as well as a reference time/date (TREF) 316.

Password evaluator 312 receives as inputs the local signon key 314 and the signon request 320 from requesting node 102, which contains the one-time password 310, the user ID 302, and the application ID 304 identifying the host application 318. In a manner to be described, password evaluator 312 uses these quantities to regenerate the original time/date 308, which is compared with the reference time date 316 to determine whether the difference between the two is within a predetermined tolerance (e.g., ±10 minutes). If so, the password evaluator 312 authenticates the user, grants access to the application 318 and generates a local copy 319 of the session key; otherwise, the evaluator denies access. In either event, the password evaluator 312 notifies the target application 318, which sends a response 322 to the requesting node 102 advising of the disposition of the signon request 320. Target application 318 uses the session key 319 as an encryption/decryption key to communicate with the client application 309 at requesting node 102.

Client/Server Implementation

Figure 2:
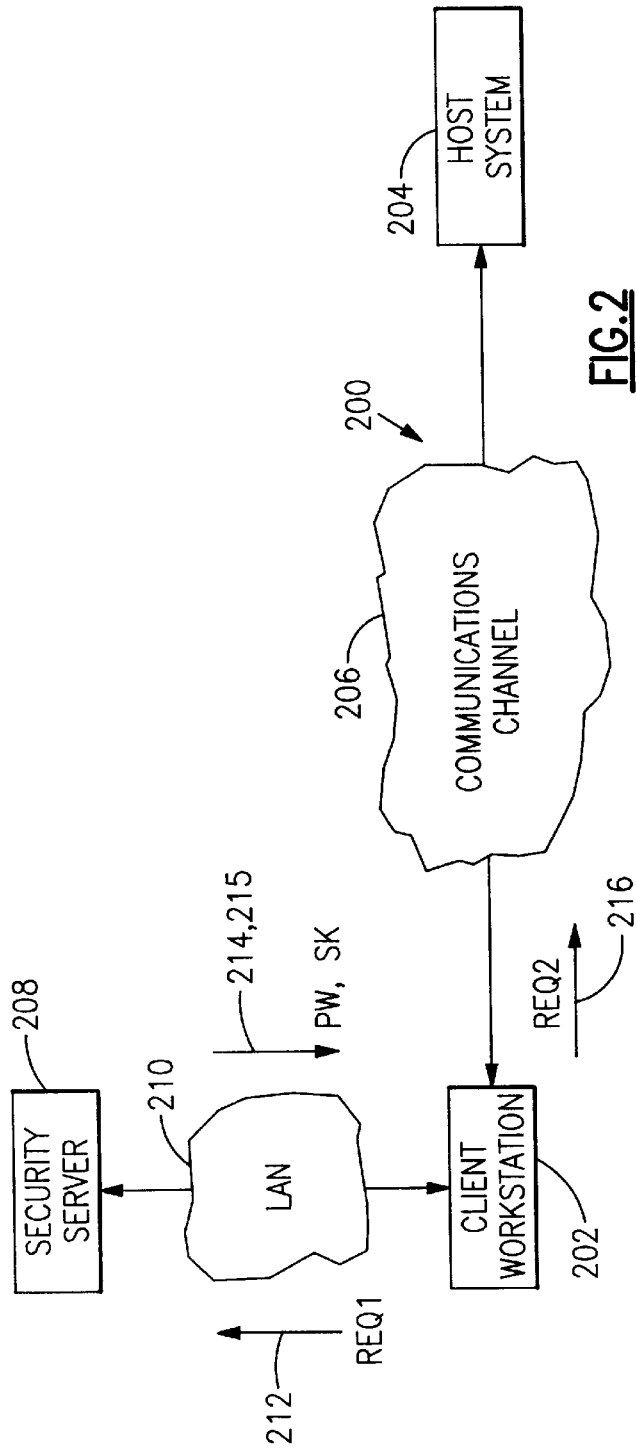
FIG. 2 is a schematic block diagram of a modified system in which the passwords are generated by a security server.

FIG. 2 shows how the present invention may be implemented in a client/server environment, with the resource-requesting function split between a client workstation and a security server workstation. The system 200 shown in FIG. 2 comprises a client workstation 202 coupled to an authentication node 204 via a communications channel 206 and to a security server workstation 208 via a local area network (LAN) 210. (Client workstation 202, security server 208 and LAN 210 may be viewed collectively as a single requesting node from the standpoint of the authenticating node 204.) Authenticating node 204 and communications channel 206 of system 200 may be similar to the corresponding elements 104 and 106 of system 100. As with requesting node 102 of system 100, client workstation 202 and server workstation 208 may comprise personal computers or workstations. LAN 210 may comprise any suitable type known to the art, such as a token-ring LAN or the like.

The authentication sequence on system 200 is as follows. A workstation user stationed at client workstation 202 first authenticates himself to the LAN 210 by entering his LAN security server authentication password. (The method for authenticating the user to the LAN 210 is outside the purview of this invention; any of several methods well known in the art, as well as that disclosed in the present application, may be used.) After authenticating himself to the LAN 210 and the security server 208, the user may wish to access a host application through a workstation (client) function. A request (REQ1) 212, which contains information identifying the user and the host application being accessed, is sent from the client 202 to the server 208 via LAN 210.

The server 208 uses this information, together with time/date information and a signon key, to generate a one-time password (PW) 214 for accessing the host application as well as a session key (KS) 215 for communicating with the host application. The one-time password 214 and session key 215 are returned through the LAN 210 to the client 202.

Client 202 transmits a signon request (REQ2) 216 containing the password together with the user and application information to the authenticating node 204. The authenticating node 204 processes the request 216 in a manner similar to the authenticating node 104 of FIGS. 1 and 3, generating a session key identical to session key 215.

After the authentication process is complete, the user application on client workstation 202 and target application on the host system 204 use the session key 215 for encrypted communications with each other.

General Interactive Flow

FIGS. 10–14 show the general flow of interactions between the client application 309 at requesting node 102, the password generator 300 at requesting node 102 (or at a separate security server node on a LAN), and the target application 318 and password evaluator 312 at authenticating node 104.

Figure 11:
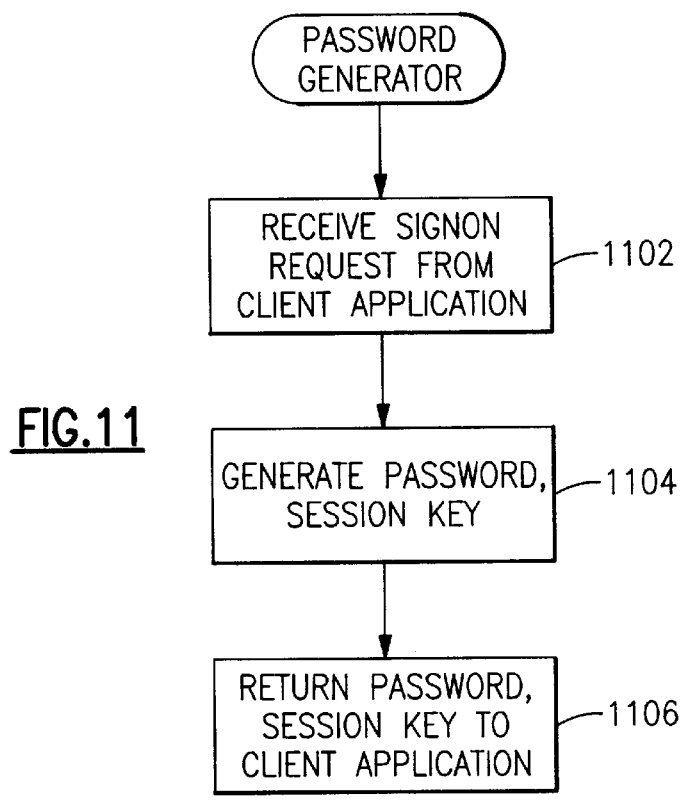
FIG. 11 is a flowchart of the steps performed by the password generator.
Figure 10:
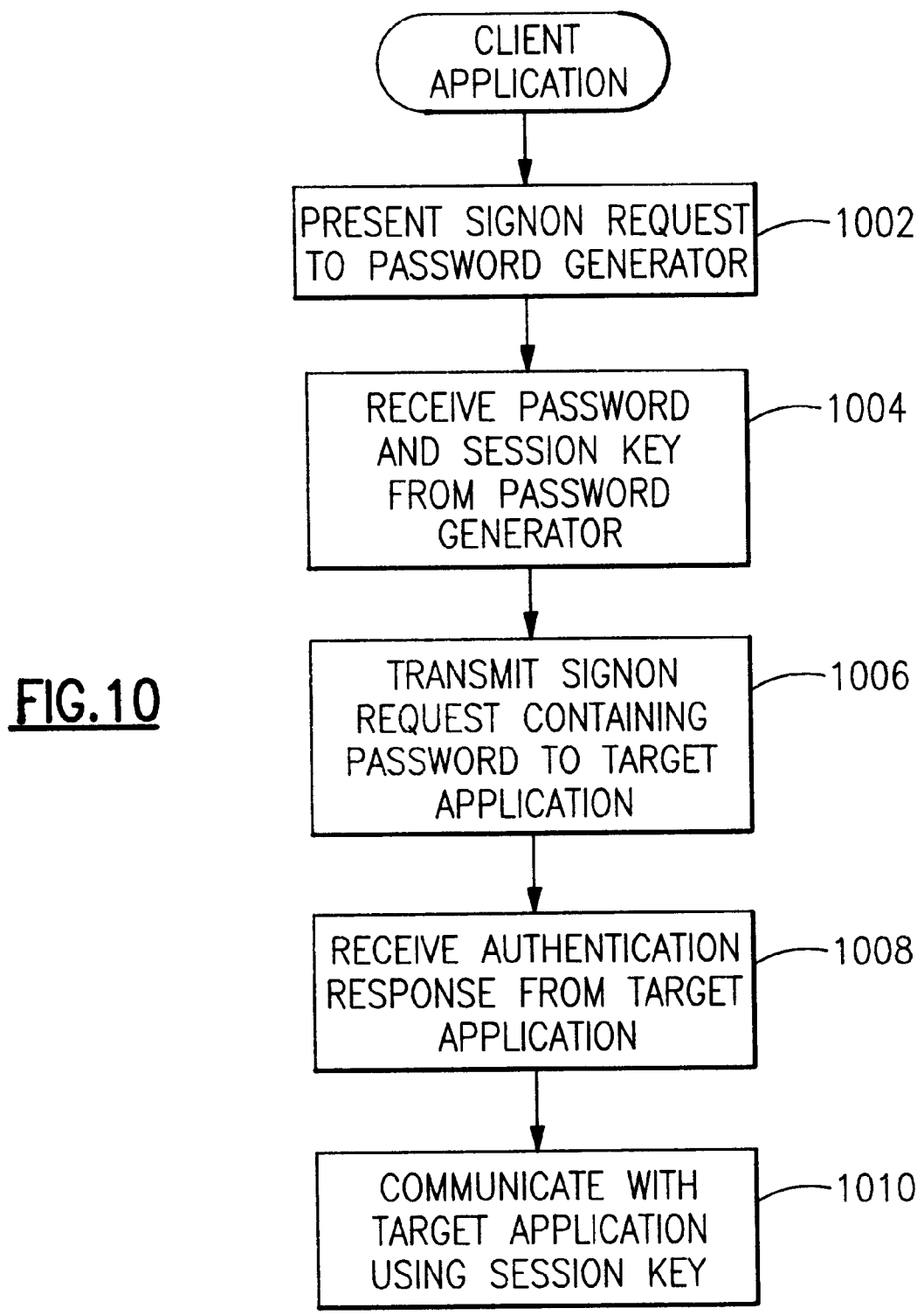
FIG. 10 is a flowchart of the steps performed by the client application.

Referring to FIG. 10, the client application 309 initially presents a signon request to the password generator 300 (step 1002). Referring now also to FIG. 11, upon receiving the signon request from client application 309 (step 1102), the password generator 300 generates a password (PW) 310 and session key (KS) 311 (step 1104) and returns them to the client application (step 1106). Upon receiving these values from the password generator 300 (step 1004), the client application 309 transmits a signon request 320 containing the password 310 and other signon information to the target application 318 (step 1006).

Figure 12:
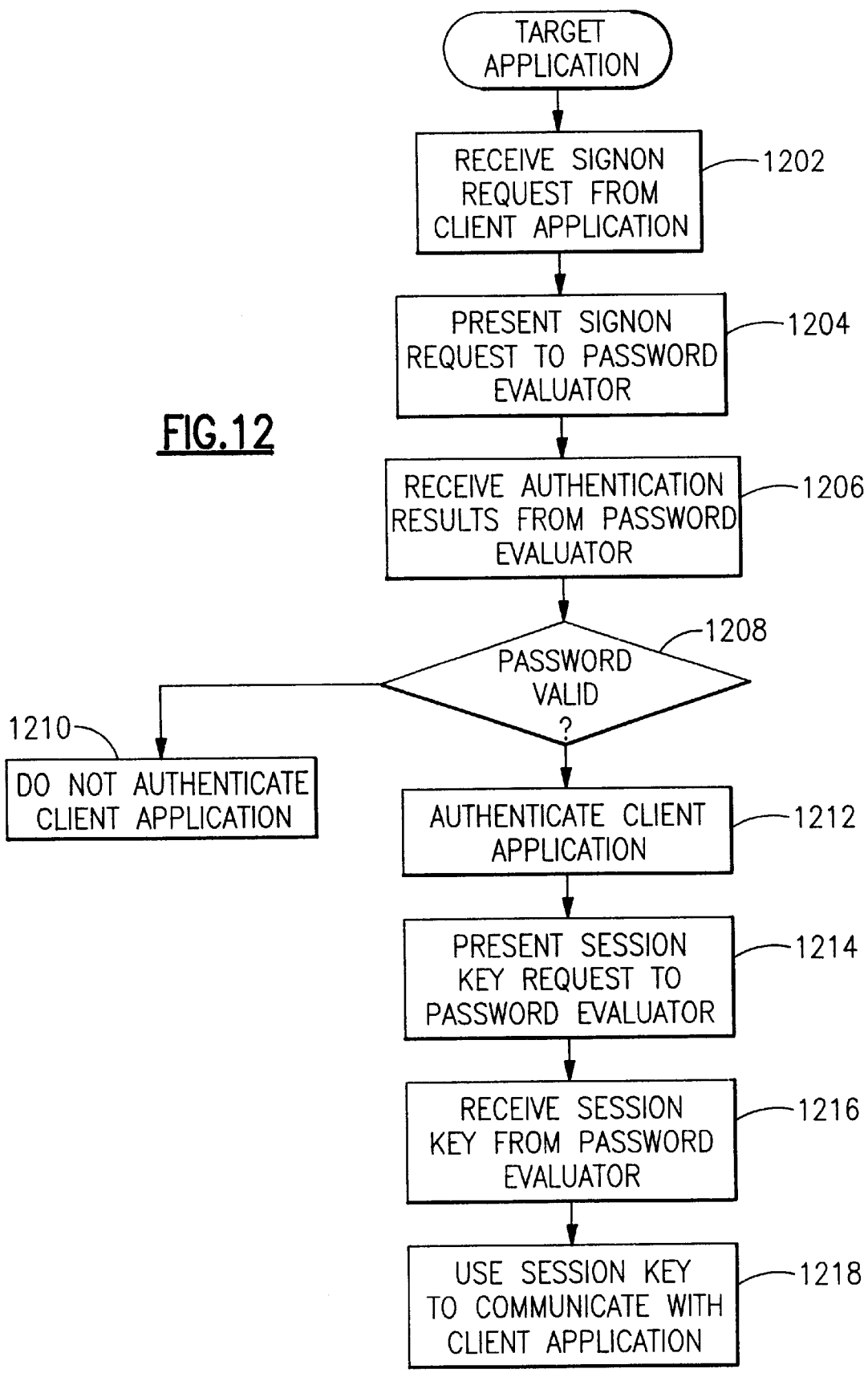
FIG. 12 (comprising FIGS. 12A–12B) is a flowchart of the steps performed by the target application.
Figure 13:
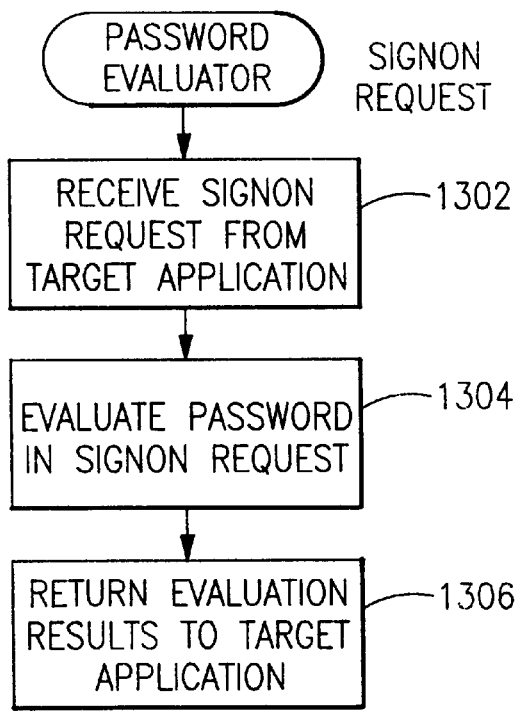
FIG. 13 is a flowchart of the steps performed by the password evaluator in response to a signon request.

Referring now also to FIG. 12, upon receiving the signon request 320 from the client application 309 (step 1202), the target application 318 presents the request to the password evaluator 312 for authentication (step 1204). Referring now also to FIG. 13, upon receiving the signon request 320 from the target application 318 (step 1302), the password evaluator 312 evaluates the password 310 in the signon request 320 (step 1304) and returns the results to the target application 318 (step 1306). The results may indicate either (1) that the password 310 is not valid and that the client application 309 should therefore not be authenticated or (2) that the password is valid and that the client application should therefore be authenticated.

Upon receiving the authentication results from the password evaluator 312 (step 1206), the target application 318 examines them to determine whether the password 310 is valid (step 1208). If not, the target application 318 does not authenticate the client application 309 and informs the client application of this via a response 322 (step 1210). If the password is valid, then the target application 318 authenticates the client application 309, informing the client application 309 of this via a response 322 (step 1212).

Upon receiving a notification 322 from the target application 318 that it has been authenticated (step 1008), the client application 309 may use the previously obtained session key KS to communicate with the target application 318 (step 1010).

To obtain its copy 319 of the session key KS, the target application 318 presents a session key request to the password evaluator 312 containing the same information (PW, UID, AID) as the original signon request (step 1214).

Figure 14:
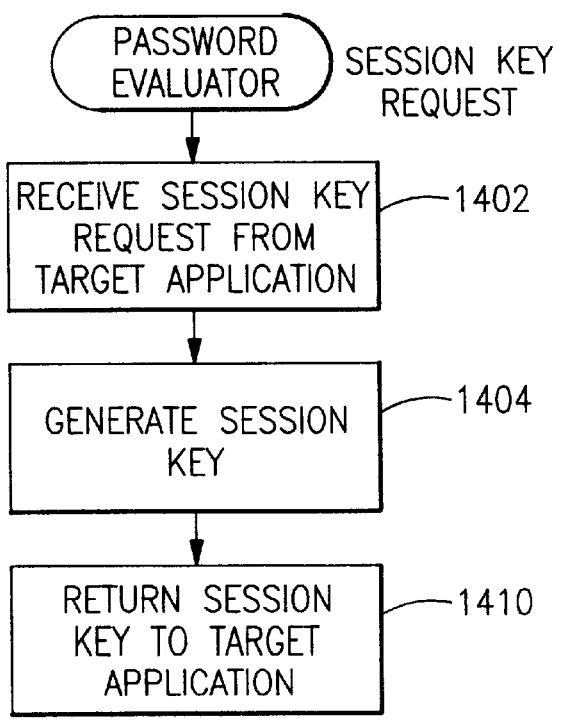
FIG. 14 is a flowchart of the steps performed by the password evaluator in response to a session key request.

Referring now also to FIG. 14, upon receiving the session key request (step 1402), password evaluator generates the session key 319 (step 1404) and returns it to the target application (step 1406). Password evaluator 312 does not check the see if the password 310 is valid on this invocation, since it has already done so on the previous invocation shown in FIG. 13. (Alternatively, steps 1404–1406 may be performed upon receiving the original signon request without requiring a separate session key request from target application 318.) Upon receiving the session key 319 from the password evaluator 312 (step 1216), the target application 318 uses the session key to communicate with the client application 309 (step 1218).

Requesting Node Procedure

Figure 4:
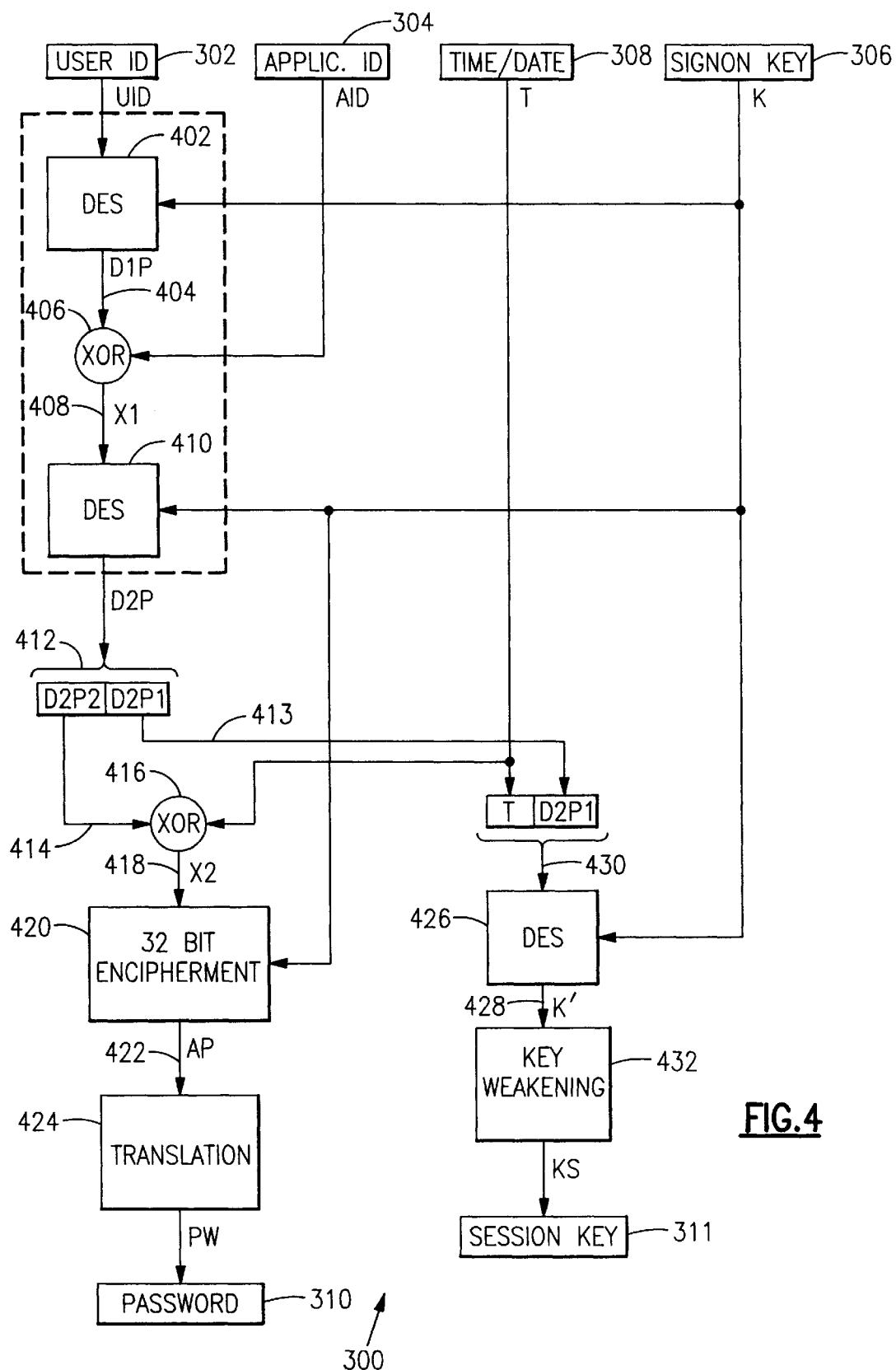
FIG. 4 is a schematic block diagram showing the data transformations performed by the password generator shown in FIG. 3.
Figure 5:
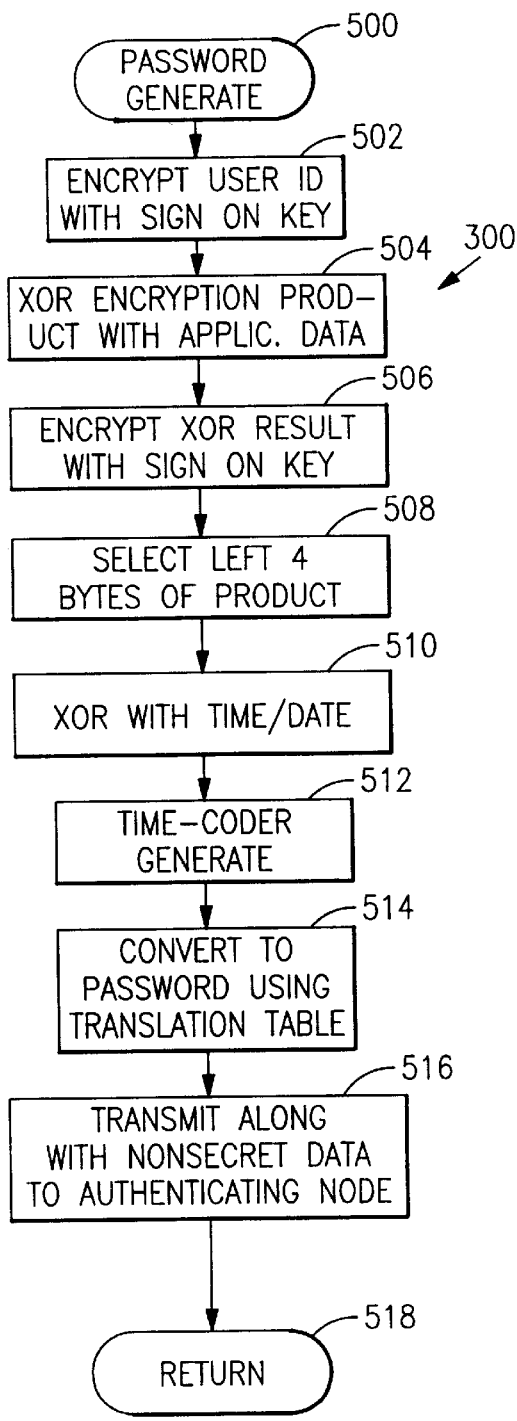
FIG. 5 is a flowchart showing the operational steps performed by the password generator shown in FIG. 3.
Figure 6:
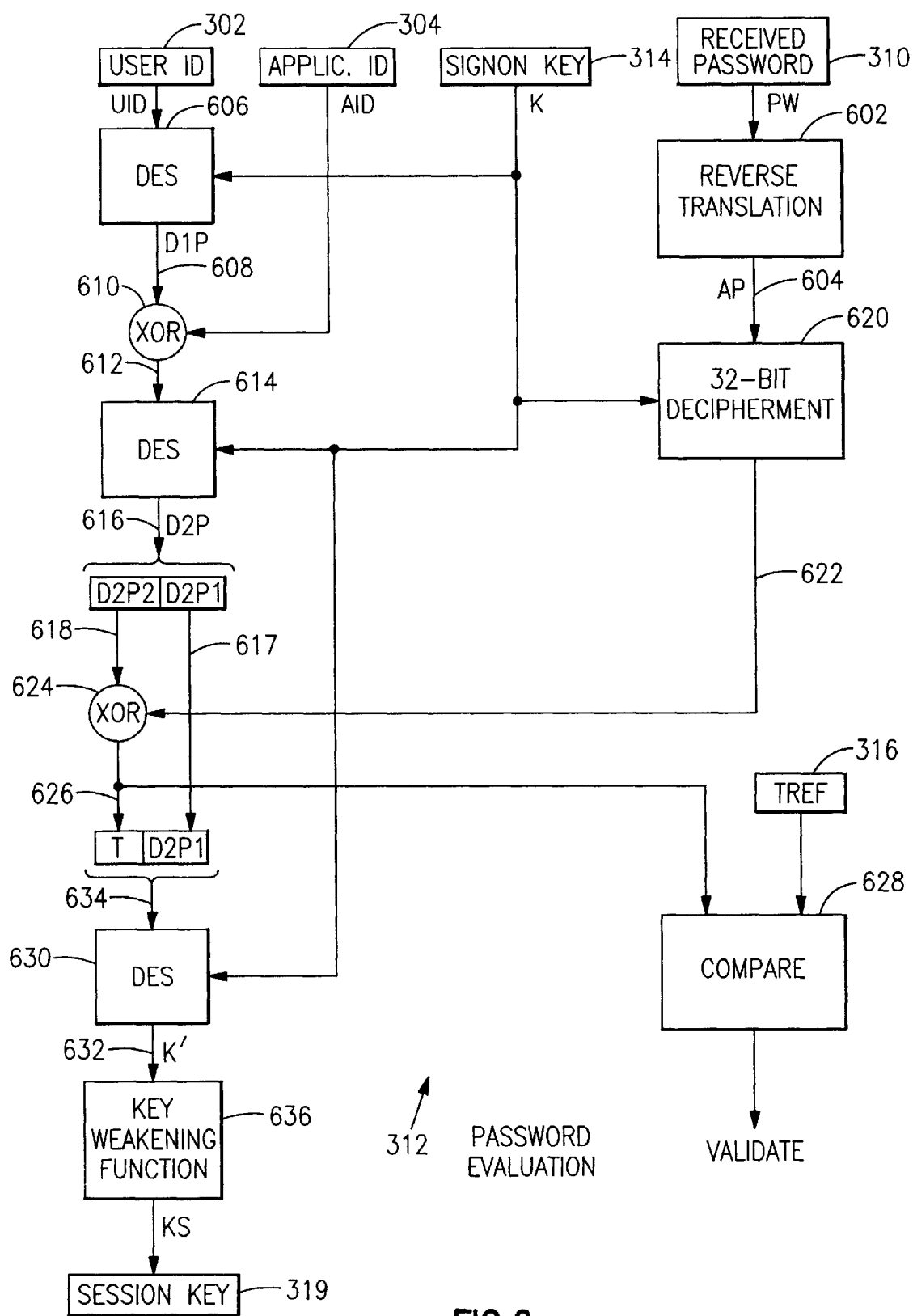
FIG. 6 is a schematic block diagram showing the data transformations performed by the password evaluator shown in FIG. 3.

FIGS. 4 and 5 show the procedure used by the password generator 300 (FIG. 3) at step 1104 to generate a one-time password 310 as a function of a secret quantity (the host signon key 306), nonsecret information 302 and 304 identifying the user and the host application, and time/date information 308. FIG. 4 shows the procedure in terms of the data transformations involved, while FIG. 5 shows the process steps performed by the preferred software implementation. FIG. 6 additionally shows the data transformations (from which the sequential process steps are apparent) for the generation of the session key 311 by the password generator 300 at step 1104.

As already noted and as shown in FIG. 4, the password generator 300 has four inputs: the host user ID (UID) 302, an application ID (AID) 304 identifying the host application 318 being accessed, a host signon key (K) 306, and the time/date (T) 308.

The user's host user ID 302 for the host application 318 is left-justified and padded to the right with blanks to a length of 8 bytes (64 bits). The application ID 304 is also left-justified and padded to the right with blanks to a length of 8 bytes. The user ID 302 and application ID 304 are in text form (typically ASCII or EBCDIC, depending on implementation) when they are actually used by the password generator 300. The signon key 306 (together with the matching signon key 314 stored at the authenticating node 104) similarly consists of 8 bytes, or 64 bits, of which 56 bits may be independently specified while the remaining 8 bits are parity bits. Preferably, different matching signon keys 306 are used for each host application being accessed. To facilitate this, the signon keys may be stored in a table 307 where they are accessed using the application ID 304.

The time/date information 308 (together with the reference time/date 316 generated by the authenticating node 104) indicates the number of time intervals of specified duration that have elapsed since a predefined start time. In the embodiment shown, the time/date information 308 represents the number of seconds that have elapsed since Jan. 1, 1970, at 0000 GMT. (The term "time/date" is used because the value as a whole indicates both the time of day (TOD) and the date; there are no separate fields for these two quantities.) The time/date input 308 is a 4-byte-long binary integer derived using a TIME macro or comparable programming function to obtain the time from the clock on the machine located at the node in question. Various programming languages support such a function. For example, in the C language, time in the required format could be obtained by the following code. Assuming variable 'ts' is declared as 'long', then invoking the function time(&ts) will return in variable 'ts' the number of seconds expired since Jan. 1, 1970, at 0000 GMT expressed as an unsigned long integer.

Password Generation

Referring still to FIGS. 4 and 5, to generate a one-time password 310, the user's host user ID 302 is first encrypted (step 502) using an appropriate encryption procedure (block 402), with the signon key 306 as the encryption key, to generate a 64-bit encryption product 404 (D1P).

Unless otherwise indicated, all encryptions described herein are done using a "one-way" implementation of the standard Data Encryption Standard (DES) procedure, which is identified in the Federal Information Processing Standard 46-1 of the Computer Systems Laboratory in Gaithersburg, Md. of the National Institute of Standards and Technology (NIST) of the United States Government. DES is a national (ANSI X9.9) and international (ISO 8730 and 8731) standard and has wide acceptance in industry and government. In addition to the source described above, DES is also described in C. H. Meyer and S. M. Matyas, *Cryptography: A new Dimension in Computer Data Security* (1982), especially at pages 113–191 and 651–670.

As noted above, the user ID 302 comprises 8 bytes of alphanumeric characters in the range of A–Z and 0–9, with trailing blanks. (The alphanumeric characters are typically ASCII or EBCDIC, depending on the implementation; in an IBM S/390 implementation, for example, EBCDIC characters are used.) One-way implementation of the DES procedure means that only the DES encoder is involved, not both the encoder and decoder. General DES encryption and decryption of data is not done with this implementation.

The 64-bit DES product 404 (D1P) of the first DES encryption pass is combined bitwise (step 504) with the application ID 304 using an exclusive OR (XOR), or modulo 2 addition, operation (block 406). In this operation, as is well known in the art, like bit inputs produce a 0 bit output while unlike bit inputs produce a 1 output. The result (X1) 408 of the XOR operation 406 is encrypted (step 506) using the DES procedure 410, with signon key 306 as the encryption key, to generate a second 64-bit encryption product 412 (D2P) representing non-time-dependent encrypted signon information. Those familiar with cryptographic techniques will recognize the flow (blocks 402–410) to be a Common Cryptographic Architecture (CCA) standard Message Authentication Code (MAC) procedure.

The non-time-dependent encrypted signon information D2P (412) is partitioned into two 2-byte halves. The left 4 bytes 414 (D2P2) of the second encryption product 412 (D2P) are selected for the password generation procedure (step 508), while the right 4 bytes 413 (D2P1) are used in the session key generation procedure as described below.

The non-time-dependent value D2P2 (414) is combined (step 510) with the time-dependent value T (308) using another XOR operation (416) to generate a 32-bit composite value X2 (416). Composite value X2 is passed as input to a 32-bit encipherment routine (block 420) which encrypts the 32-bit quantity 418 (step 512), using the signon key K as an encryption key, to produce a 32-bit output quantity 422 referred to herein as the authentication parameter (AP).

The particulars of the encipherment routine 420 are described in the Coppersmith et al. patent referred to above. Such particulars are not part of the present invention, however, and hence are not reproduced herein. In general, any reversible encryption procedure that transforms a 32-bit input block into a 32-bit output block may be used for encipherment routine 420.

The authentication parameter (AP) 422 is passed to a translation routine (block 424). Translation routine 424 reversibly transforms the 32-bit authentication parameter (AP) 422 into an 8-character string—the one-time password (PW) 310—that is used in the user's host application signon request instead of the user's regular host password (step 514). Finally, the password (PW) 310 is returned to the client application 309 so that it may be transmitted, along with the nonsecret quantities 302 (UID) and 304 (AID) and other signon information, to the authenticating node 104 (step 516).

In general, any reversible procedure that transforms a 32-bit block into an 8-character string (with the character strings preferably being distributed pseudorandomly across the space of possible string values) may be used for translation routine 424. Thus, as described in the Coppersmith et al. patent referred to above, each character of the string may be derived from a 6-bit subset of the 32-bit bit input block, with a 2-bit overlap between successive subsets. Such particulars form no part of the present invention, however, and hence are not reproduced herein.

Because the transformation of the composite value X2 into the authentication parameter AP is a cryptographic transformation, the AP values (as well as the values of the corresponding passwords PW) for successive time values T are highly random in appearance; to a person without the key K, knowledge of the AP or password value for one time period provides no useful information about the value for another time period, even if it is the very next period.

Session Key Generation

The same quantities used to generate the one-time password 310 are also used to generate the session key 311 for communications between the client application 309 at the requesting node 102 and the target application 318 at the authenticating node 104.

Referring to FIG. 4, signon key K (306) is used as an encryption key for a DES encryption function 426 to produce a 64-bit output block K' (428). The 64-bit input block 430 for DES encryption function 426 is obtained by concatenating the 32-bit time/date value T (308) with an additional value comprising the 32-bit right half D2P1 (413) of the second DES encryption product D2P (412), which is derived from the secret signon key K and the nonsecret signon information (UID, AID) in the manner described above. In the embodiment shown, the time/date T forms the left half (i.e., most significant 32 bits) of the input block 430 while the value D2P1 forms the right half (i.e., least significant 32 bits) of the input block.

The output block K' produced by DES encryption function 426 is passed through a key weakening function 432 to produce session key KS (311). Session key KS is returned to the client application 309. It is not transmitted to the authenticating node 104, since that node is capable of independently generating the session key from the values available at that node, as described below.

Key weakening function 432 transforms the value K' (which may be viewed as a strong encryption key were it to be used as the session key) into a weakened session key KS by constraining the session key KS to one of a predetermined number of possible values that is less than the number of possible input values K'. Thus, value K' may be regarded as being selected from a first, strong key space composed of $2^{56}$ keys if the DES parity bits are ignored (as they are in DES encryption). Key weakening function 432 maps each key K' belonging to this first key space to a second, key space composed of $2^{40}$ weakened keys KS. Preferably, key weakening function 426 is implemented as described in Elander et al. U.S. Pat. No. 5,323,464, entitled "Commercial Data Masking", incorporated herein by reference.

Figure 8:
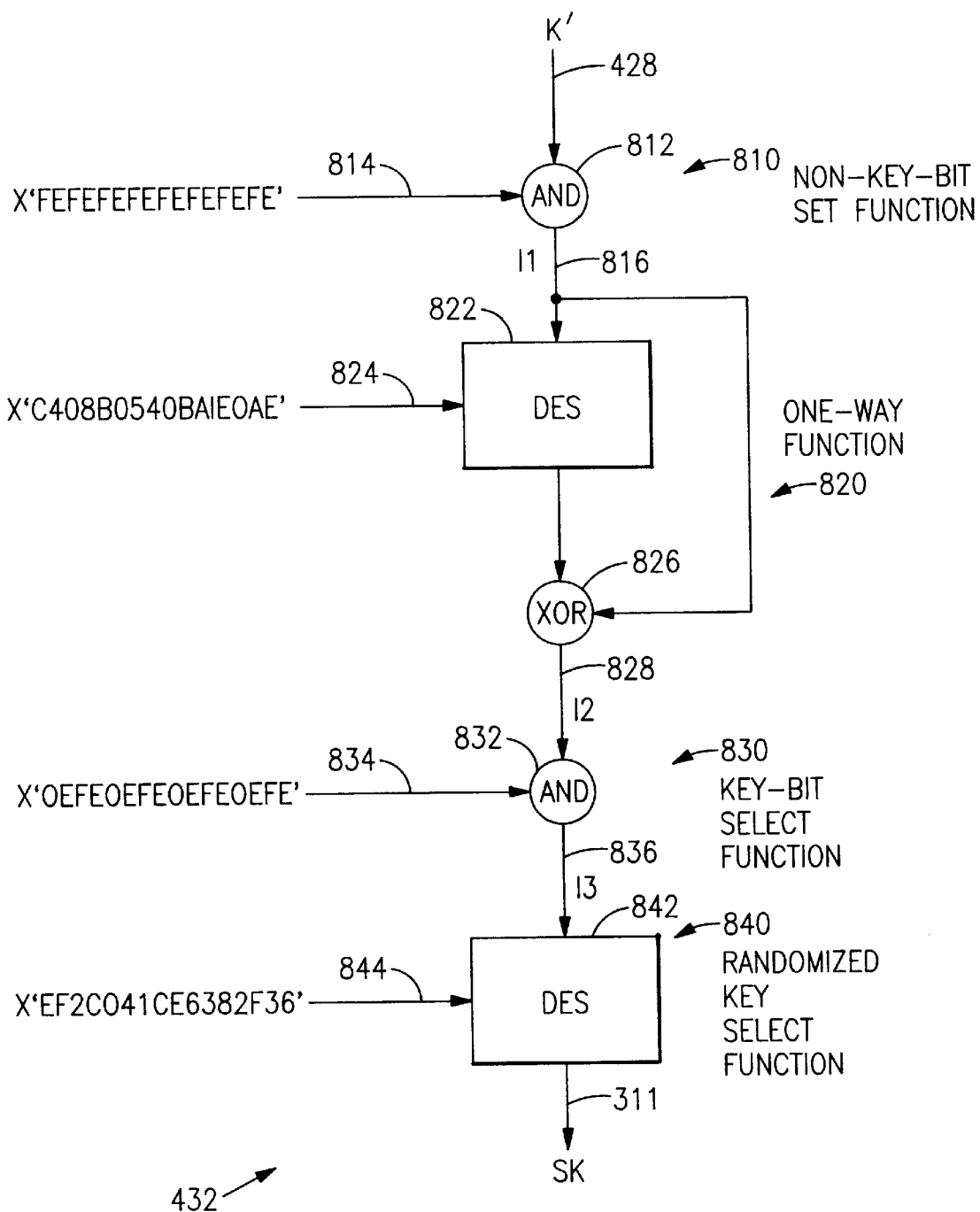
FIG. 8 is a schematic block diagram of the internals of the key weakening function shown in FIGS. 4 and 6.

FIG. 8 shows an exemplary implementation of the key weakening function 426 as described in the Elander et al. patent. Referring to FIG. 8, the original value K' is successively passed through a plurality of functions to obtain a weakened session key KS, including a non-key-bit set function 810 to produce a first intermediate value I1, a one-way function 820 to produce a second intermediate value I2, a key-bit-select function 830 to produce a third intermediate value I3, and a randomized key-select function 840 to produce the weakened session key KS.

Non-key-bit set function 810 sets predetermined non-key bits of the input value K', corresponding to parity bits of a DES key, at preselected values. In a DES key, the least significant bit of each byte is a parity bit. Accordingly, non-key-bit set function 810 is implemented by an AND gate 812, which ANDs K' with a constant having the hexadecimal value x'FEFEFEFEFEFEFEFE' (814) to set the least significant bit of each byte of the first intermediate value I1 (816) to 0.

One-way function 820 transforms the first intermediate value I1 into a second intermediate value I2 from which the first intermediate value I1 cannot feasibly be derived. This is implemented by a DES encryption function 822, which encrypts I1 with predetermined constant x'C408B054OBA1E0AE' (824) and XORs (826) the encryption result with I1 to generate the second intermediate value I2 (828).

Key-bit select function 830 fixes a subset of the bits of the second intermediate value I2 at predetermined values to provide the essential key-weakening function. This is implemented by ANDing (832) the second intermediate value I2 with a mask x'0EFE0EFE0E0FE0EFE' (834) to generate a third intermediate value I3 (836) in which 6 bits of each group of 16 bits are set to 0.

Finally, randomized key-select function 840 pseudorandomly transforms the third intermediate value I3 into a particular final value KS from a set of $2^{40}$ possible KS values that are distributed pseudorandomly across the space of 64-bit values $\{0, 1\}^{64}$. This is accomplished by DES encrypting (842) I3 with a constant x'EF2C041CE6382F36' (844) to generate session key KS.

One-way function 820 protects the input value K' to key weakening function 432 (and hence the long-lived signon key K) from discovery even if the session key KS becomes known to an attacker. Thus, even if the attacker ascertained the 56 key bits of I2 (and thus 256 candidate values for I2, since the 8 non-key bits are discarded by the key-bit select function 830) by working backwards from the session key KS, he cannot work backwards through one-way function 820. Rather, the attacker would have to try all possible values of the 56 key bits of I1 (setting the non-key bits to 0) to be assured of even obtaining one candidate I2 value. This is computationally infeasible given reasonable restrictions on time and computing resources. Accordingly, even if the weakened key KS is somehow compromised, the original signon key K remains protected.

As will be appreciated by those skilled in the art, procedures other than the one shown in FIGS. 4 and 8 could be used to derive the session key KS from the signon key K and nonsecret parameters UID, AID and T. In general, as long as the signon key is used as an encryption key rather than as an encrypted value, it will be protected from discovery other than by brute-force methods, since the ciphertext output of an encryption operation is a one-way function of the encryption key.

Figure 9:
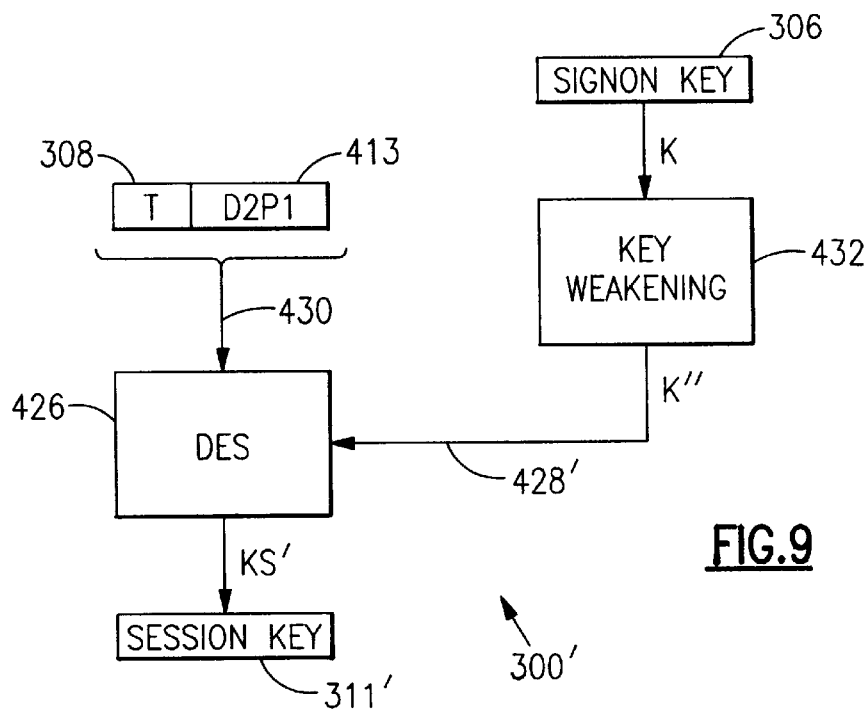
FIG. 9 is a schematic block diagram of an alternative method of generating the session key.

Also, while the disclosed embodiment invokes the key weakening function 432 as the ultimate step in generating the session key KS, the key weakening function could alternatively be used elsewhere in the derivation process. For example, as shown in FIG. 9, in an alternative embodiment 300' the signon key K (306) could itself be passed through the key weakening function 432 to generate a weakened key K" (428') that is used to encrypt the concatenated value 430, and the output of the DES encryption function 426 used directly as a session key KS' (311'). Even though the signon key K is not used directly as an encryption key, it remains protected from discovery because it operates only through one-way functions (i.e., DES encryption function 426 and the one-way function 820 in key weakening function 432).

Authentication Node Procedure

Figure 7:
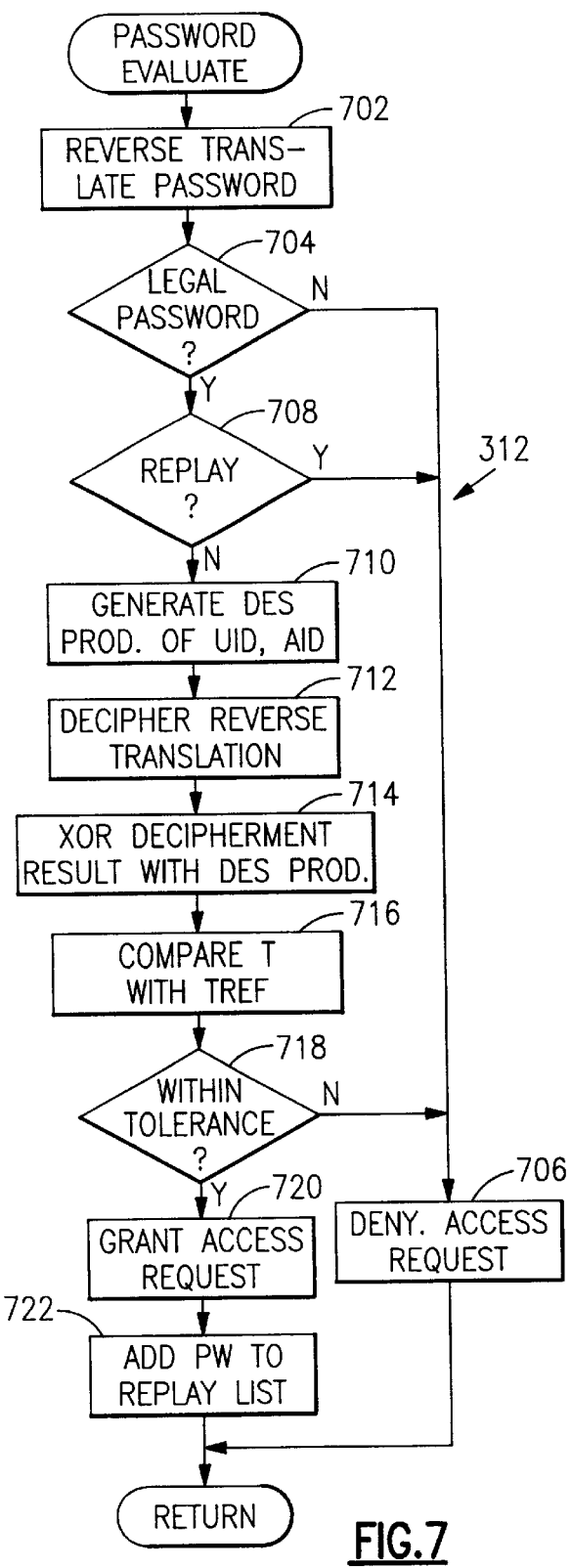
FIG. 7 is a flowchart showing the operational steps performed by the password evaluator shown in FIG. 3.

FIGS. 6–7 show the procedure used by the password evaluator 312 (FIG. 3) at step 1304 to evaluate an authentication request 320 containing a one-time password (PW) 310, a user ID (UID) 302 and an application ID (AID) 304 received from a requesting node. As with FIGS. 4–5, FIG. 6 shows the procedure in terms of the data transformations involved, while FIG. 7 shows the process steps performed by the preferred software implementation. FIG. 6 additionally shows the data transformations (from which the sequential process steps are apparent) for the generation of the session key 319 by the password evaluator 312 at step 1408.

Password Validation

Referring to FIGS. 6–7, upon receiving a signon request containing a one-time password (PW) 310, the password evaluator 312 first attempts to reverse translate the password 310 (step 702), using a reverse translation procedure 602 described further below. This attempt results in the regeneration of the 32-bit authentication parameter AP (604) if the received password corresponds to a legal password (i.e., a password that could have been generated from some value of the 32-bit AP 422 inputted to the translation routine 424). If the reverse translation procedure 602 determines that the received password 310 does not correspond to a legal password (step 704), then the password evaluator 312 denies access (step 706) without further processing, since the received password represents either an attempt to break into the system or a corruption of data.

If the received password 310 does correspond to a legal password, then the password evaluator 312 determines whether the received password is identical to any valid password received over a predefined time interval (step 708); the interval is 10 minutes in the disclosed embodiment, but may be more or less if desired. If the received password is identical to a password received within the defined time interval, the just-received password is rejected as a "replay" of the previously received password (step 706). Since the valid password for a given user ID and application ID changes every second in the disclosed embodiment, the only realistic manner in which an identical password could be generated is by interception of a previously transmitted password (e.g., as it traverses the communications channel 106) and "replay" of that password by injecting it back into the system.

If the received password is not a replay of the previously generated password, the password evaluator 312 proceeds (step 710) to generate a 32-bit encryption product D2P2 (618) in a manner similar to the generation of the corresponding product D2P2 (414) by the password generator 300, except that the key used is the signon key K (314) stored at the authenticating node 104. If, as in the preferred embodiment, the signon key K varies with the host application, then the host signon key 314 may be obtained by accessing the entry in a local table 315 corresponding to the received application ID (AID) 306. Portions 606–616 of the password evaluation procedure 312, which generate the 32-bit encryption products D2P1 (617) and D2P2 (618), are identical to the corresponding portions 402–412 of the password generation procedure 300.

Next (step 712), the regenerated 32-bit AP 604 is passed to a 32-bit decipherment routine 620 that is the inverse of the 32-bit encipherment routine 420 of the password generator 300. Decipherment routine 620 routine converts the encrypted 32-bit AP 604 to a decrypted 32-bit quantity (X2) 622. The latter quantity 622, which corresponds to the unencrypted 32-bit quantity X2 (418) of FIG. 4, is then combined (step 714) with the 32-bit encryption product DP2P (618), using an XOR operation 624, to regenerate a time/date value T (626).

The regenerated value T (626) is compared (step 716) with the reference time/date value TREF (316) generated locally by the authenticating node 104, using a suitable comparison routine 628. If the regenerated value T (626) is outside a predetermined tolerance (e.g., ±10 min) of TREF (316) (step 718), the password evaluator 312 denies access (step 706), since the password does not correspond to a valid time period.

If the regenerated value T (626) is within the predetermined tolerance, the evaluator 312 validates the requestor and grants the request for access to the host application 318 (step 720). Although the session key KS is not generated at this time, the results of this validation determine whether the password evaluator 312 generates the session key later in response to a session key request from the target application 318.

Finally, the validated password is added to a queue of comparison passwords for replay detection (step 722). Validated passwords are added to the queue in order of their generation time T (as kept by the particular requesting node) rather than their arrival time as indicated by the host time TREF (which may differ from T). They are purged from the queue when their generation time T falls more than 10 minutes behind the current host time TREF, since by that time they are stale and cannot be successfully replayed into the system. This purging occurs upon the validation of a password (after step 720), as well as just before checking the queue for a reused password (at step 708).

The flowchart shown in FIG. 7 assumes that all of the steps are performed sequentially. Alternatively, the steps for generating the non-time-dependent value D2P2 (step 710) can be performed in parallel with the steps for regenerating the composite value X2 (steps 702, 704, 710 and 712), since neither of these portions of the routine depends on the results of the other. If this is done, then the regeneration of the time-of-day value T can be performed immediately upon the availability of X2, without having to delay further while awaiting the generation of D2P2. (The X2 leg dominates timewise, since the 32-bit decryption routine performs 6 DES passes, one for each round, whereas the generation of D2P2 requires only 2 DES passes.) Similarly, the replay check (step 708) can be performed in parallel with the remainder of the validating portion of the routine.

Session Key Generation

Session key 319 (KS) is generated in the same manner at the authenticating node 104 at step 1404 as the identical session key 311 was at the requesting node 102 at step 1104, with the time value T being the regenerated value 626 obtained from the received password 310. Referring to FIG. 6, the authenticating node copy of the signon key K (314) provides the key input to a DES encryption function 630 (invoked only for session key generation and not for password evaluation) to produce a output value K' (632) identical to the value K' (428) generated at the requesting node 102.

The input 634 to DES encryption function 630 is identical to the input 430 to the DES encryption function 426 at the requesting node 102 and is obtained in a similar manner by concatenating the regenerated and validated time/date value T (626) with the right half D2P1 (617) of the second DES encryption product D2P (616). Values T and D2P1 are generated anew in response to the session key request by repeating the transformations 606–624 (but not the time comparison 628) previously performed for the signon request from target application 318. (Alternatively, values T and D2P1 may be saved from the previous handling of the signon request.) Value K' is passed through a key weakening function 636 identical to key weakening function 432, and invoked only for session key generation and not for password evaluation, to produce the authenticating node copy of session key KS (638) as an output.

To recapitulate the use of the functions shown in FIG. 6, functions 606–624 (which generate output values T and D2P1 from input values PW, UID and AID) are invoked in response to both the signon request and the session key request from target application 318. The time comparison function 628 is only invoked for the signon request to validate the password PW, while encryption function 630 and key weakening function 636 are only invoked for the session key request to generate the session key KS.

Conclusion

Various modifications of the disclosed embodiments will be apparent to those skilled in the art. Other nonsecret information such as a workstation ID could be used instead of or in addition to the user ID and application ID to generate the authentication parameter. As noted above, while the authentication system is preferably implemented with software, it may also be implemented in whole or in part by hardware. As also noted above, certain portions of the procedure may be performed in parallel rather than sequentially as described. Further, while the time-of-day value changes each second, other time intervals of greater or lesser duration could be used. Similarly, comparison tolerances of greater or less than 10 minutes could be used. Although the disclosed embodiments involve workstations that access applications on host computers, other types of requesting nodes and authenticating nodes are within the scope of the invention. Also, the one-time password generator may be located on a card or other device carried by the user rather than on a fixed workstation.

In the disclosed embodiment the communicating entities (the client application and the target application) have other applications (the password generator and the password evaluator) performing authentication and session key generation functions on their behalf. However, the present invention is not limited to any particular partitioning of these functions among applications, and the communicating applications could perform these functions without using other applications if desired. Still other modifications will be apparent to those skilled in the art.

What is claimed is:

1. A method for authenticatiing a first entity to a second entity and for generating a secret session key for communication between said entities, wherein said first entity performs the steps of:

generating an authentication value from secret information shared by said entities and nonsecret time-dependent information;

transmitting said authenitcation value to said second entity to authenticate said first entity to said second entity;

generating from said shared secret information and said nonsecret time-dependent information a secret session key that cannot be derived from said authentication value without said shared secret information; and using said secret session key for encrypted communications with said second entity.

2. The method of claim 1 wherein said shared secret information comprises an encryption key, said step of generating said session key comprising the step of:

encrypting said nonsecret time-dependent information using said encryption key to generate said session key.

3. The method of claim 1 wherein said step of generating said session key comprises the step of:

transforming a strong encryption key derived from said shared secret information into a weakened encryption key from which said session key is derived using a key weakening function, said strong encryption key being selected from a first key space composed of a first number of keys, said key weakening function mapping each strong key from said first key space to a corresponding weakened key in a second key space composed of a smaller number of keys than said first key space.

4. The method of claim 3 wherein said strong encryption key is derived from said shared secret information by encrypting said nonsecret time-dependent infromation using said shared secret infromation as an encryption key.

5. The method of claim 3 wherein said session key comprises said weakened key.

6. The method of claim 3 wherein said shared secret information comprises said strong encryption key.

7. The method of claim 3 wherein said session key is derived from said weakened key by encrypting said nonsecret time-dependent information using said weakened key as an encryption key.

8. The method of claim 3 wherein said first key space is composed of $2^{56}$ keys and said second key space is composed of $2^{40}$ keys.

9. The method of claim 3 wherein said transforming step comprises the step of:

fixing predetermined bits of an input value derived from said strong key to generate an output value, said weakened key being derived from said output value.

10. The method of claim 9 wherein said transforming step comprises the further step of:

passing said strong key through a one-way function to generate said input value.

11. The method of claim 9 wherein said transforming step comprises the further step of:

pseudorandomly transforming said output value to generate said weakened key.

12. The method of claim 2 wherein said nonsecret time-dependent information is combined with an additional value before being encrypted.

13. The method of claim 2 wherein said nonsecret time-dependent information is concatenated with an additional value.

14. The method of claim 2 wherein said additional value is derived from said shared secret information.

15. The method of claim 1 wherein said nonsecret time-dependent information comprises time-of-day (TOD) information.

16. The method of claim 1 wherein said authentication value comprises a password.

17. The method of claim 1 wherein said step of generating said authentication value comprises the steps of:

combining said nonsecret time-dependent information with non-time-dependent information to generate composite information; and encrypting said composite information to generate said authentication value.

18. The method of claim 17 wherein said nonsecret time-dependent information is combined with said non-time-dependent information by modulo addition.

19. The method of claim 17 wherein said non-time-dependent information is derived by encrypting nonsecret information identifying a request for authentication to generate encrypted information.

20. The method of claim 17 wherein said encrypted information is partitioned into two parts, one of which is combined with said nonsecret time-dependent information to generate said composite information and the other of which is used to generate said session key.

21. The method of claim 1 wherein said second entity performs the steps of:

receiving said authentication value from said first entity;

validating said authentication value using said shared secret information to determine whether said authentication value is valid; and if said authentication value is determined to be valid, authenticating said first entity and generating said session key from said shared secret information and said time-dependent information.

22. The method of claim 21 wherein said step of validating said authentication value includes the steps of:

recovering said nonsecret time-dependent information from said authentication value and said shared secret information; and comparing the recovered nonsecret time-dependent information with reference nonsecret time-dependent information.

23. A program storage device readable by a machine, tangibly embodying a program of instructions executable by the machine to perform the method steps of claim 1.

24. In a system in which a first entity generates an authentication value from secret information and nonsecret time-dependent information and transmits said authentication value to a second entity sharing said secret information with said first entity, a method for authenticating said first entity and for generating a secret session key for communication with said first entity, wherein said second entity performs the steps of:

receiving said authentication value from said first entity;

validating said authentication value using said shared secret information to determine whether said authentication value is valid;

if said authentication value is determined to be valid, authenticating said first entity and generating from said shared secret information and said nonsecret time-dependent information a secret session key that cannot be derived from said authentication value without said shared secret information; and using said secret session key for encrypted communications with said first entity.

25. A program storage device readable by a machine, tangibly embodying a program of instructions executable by the machine to perform the method steps of claim 24.

26. Apparatus for authenticating a first entity to a second entity and for generating a secret session key for communication between said entities, said apparatus comprising:

means associated with said first entity for generating an authentication value from secret information shared by said entities and nonsecret time-dependent information;

means associated with said first entity for transmitting said authentication value to said second entity to authenticate said first entity to said second entity;

means associated with said first entity for generating from said share secret information and said nonsecret time-dependent information a secret session key that cannot be derived from said authentication value without said shared secret information; and means associated with said first entity for using said secret session key for encrypted communications with said second entity.

27. In a system in which a first entity generates an authentication value from secret information and nonsecret time-dependent information and transmits said authentication value to a second entity sharing said secret information with said first entity, apparatus for authenticating said first entity and for generating a secret session key for communication with said first entity, comprising:

means associated with said second entity for receiving said authentication value from said first entity;

means associated with said second entity for validating said authentication value using said shared secret information to determine whether said authentication value is valid;

means associated with said second entity and responsive to a determination that said authentication value is valid for authenticating and said first entity and generating from said shared secret information and said nonsecret time-dependent information a secret session key that cannot be derived from said authentication value without said shared secret information; and means addociated with said second entity for using said secret session key for encrypted communications with said first entity.

* * * * *

UNITED STATES PATENT AND TRADEMARK OFFICE
CERTIFICATE OF CORRECTION

PATENT NO.    : 6,292,896 B1
DATED         : September 18, 2001
INVENTOR(S)   : Guski et al.

It is certified that error appears in the above-identified patent and that said Letters Patent is hereby corrected as shown below:

<u>Column 14,</u>
Line 53, reads "information and said time-dependent information." should read
-- information and said nonsecret time-dependent information --.

Signed and Sealed this

Nineteenth Day of November, 2002

*Attest:*

*Attesting Officer*

JAMES E. ROGAN
*Director of the United States Patent and Trademark Office*